United States Patent [19]

Krieg

[11] 4,294,013

[45] Oct. 13, 1981

[54] PORTABLE HACKSAW

[75] Inventor: Adrian H. Krieg, Woodbridge, Conn.

[73] Assignee: Widder Corporation, Naugatuck, Conn.

[21] Appl. No.: 124,448

[22] Filed: Feb. 25, 1980

[51] Int. Cl.³ .............................................. B27B 11/00
[52] U.S. Cl. ........................................ 30/392; 83/750
[58] Field of Search ........................ 30/392, 393, 394; 279/89, 91; 83/750

[56] References Cited

U.S. PATENT DOCUMENTS

| | | | |
|---|---|---|---|
| 2,722,244 | 11/1955 | Schultz | 30/394 |
| 3,542,097 | 11/1970 | Dudek | 30/392 |
| 3,555,678 | 1/1971 | Agulnick | 30/393 |
| 3,905,105 | 9/1975 | Tuke | 30/393 |

*Primary Examiner*—Jimmy C. Peters
*Attorney, Agent, or Firm*—Kenneth J. Stempler

[57] ABSTRACT

A replaceable hacksaw blade, a reciprocating shaft connected to the hacksaw motor, and a novel clamp for securing the blade to the shaft, the blade and shaft having cooperating abutments for better securing the blade against rotational forces and vibration.

15 Claims, 13 Drawing Figures

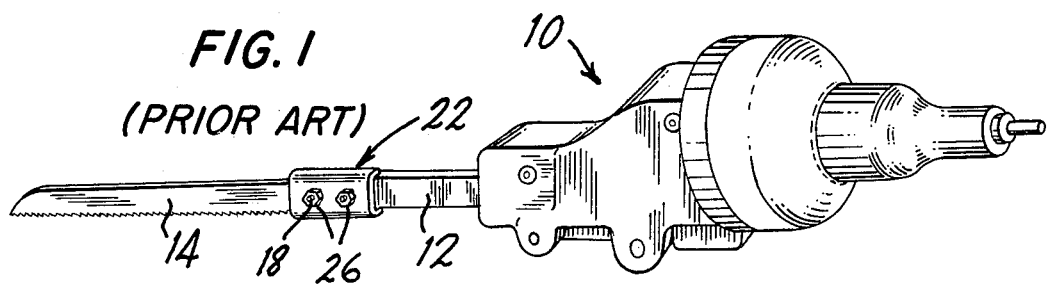
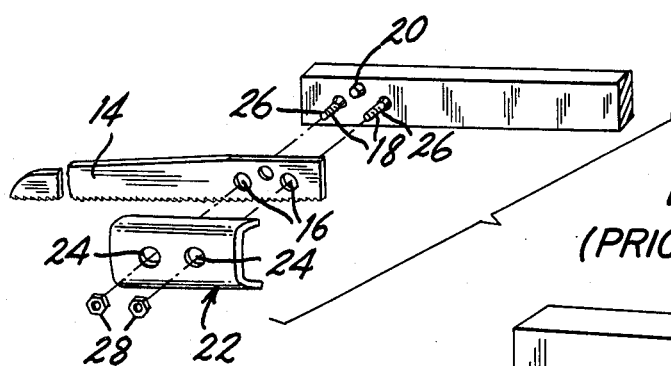
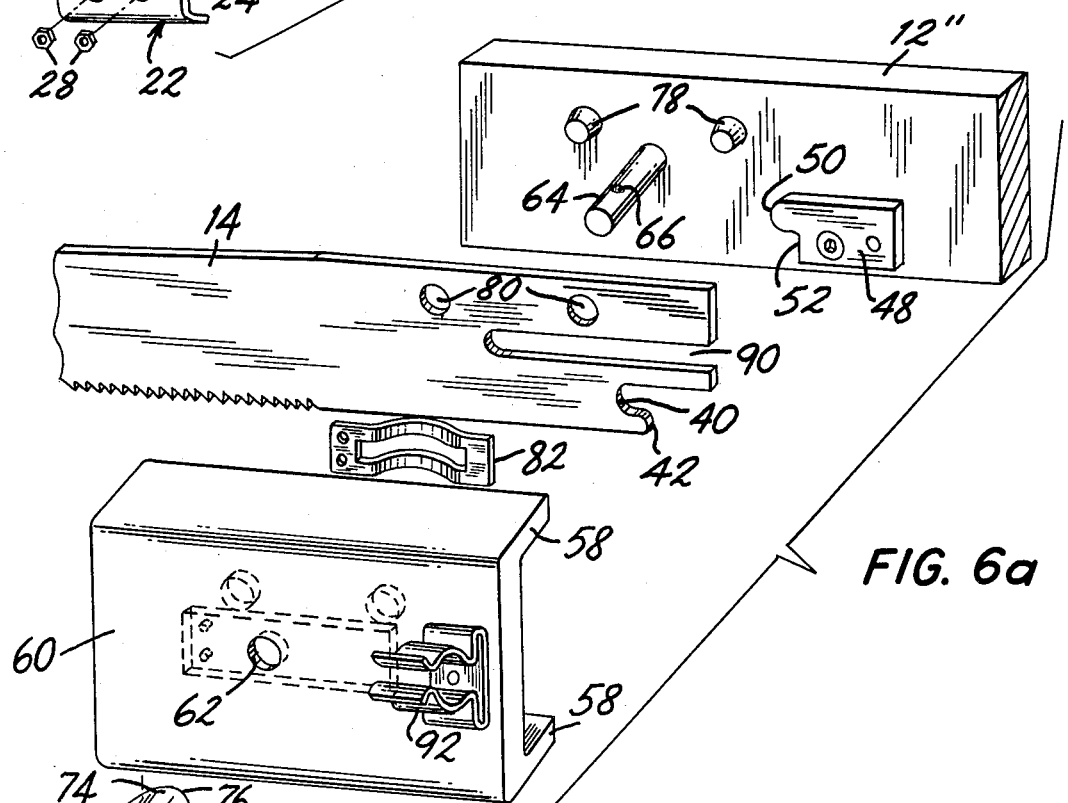
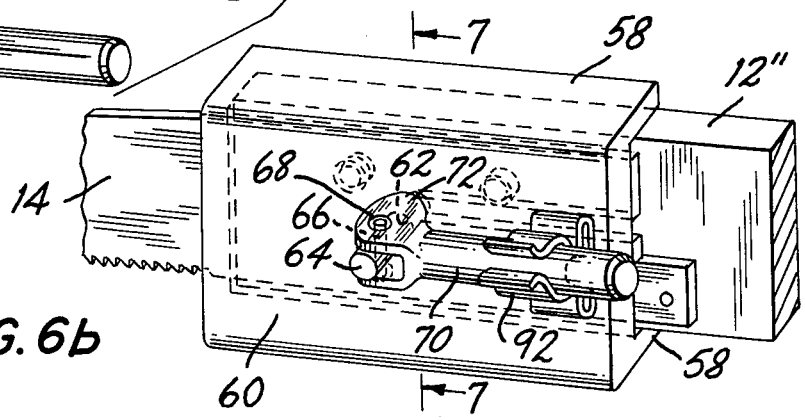

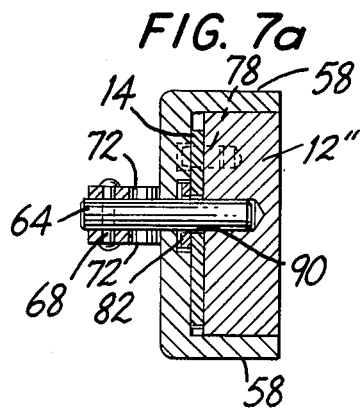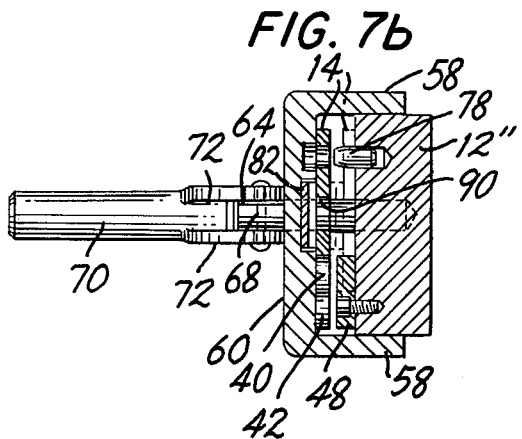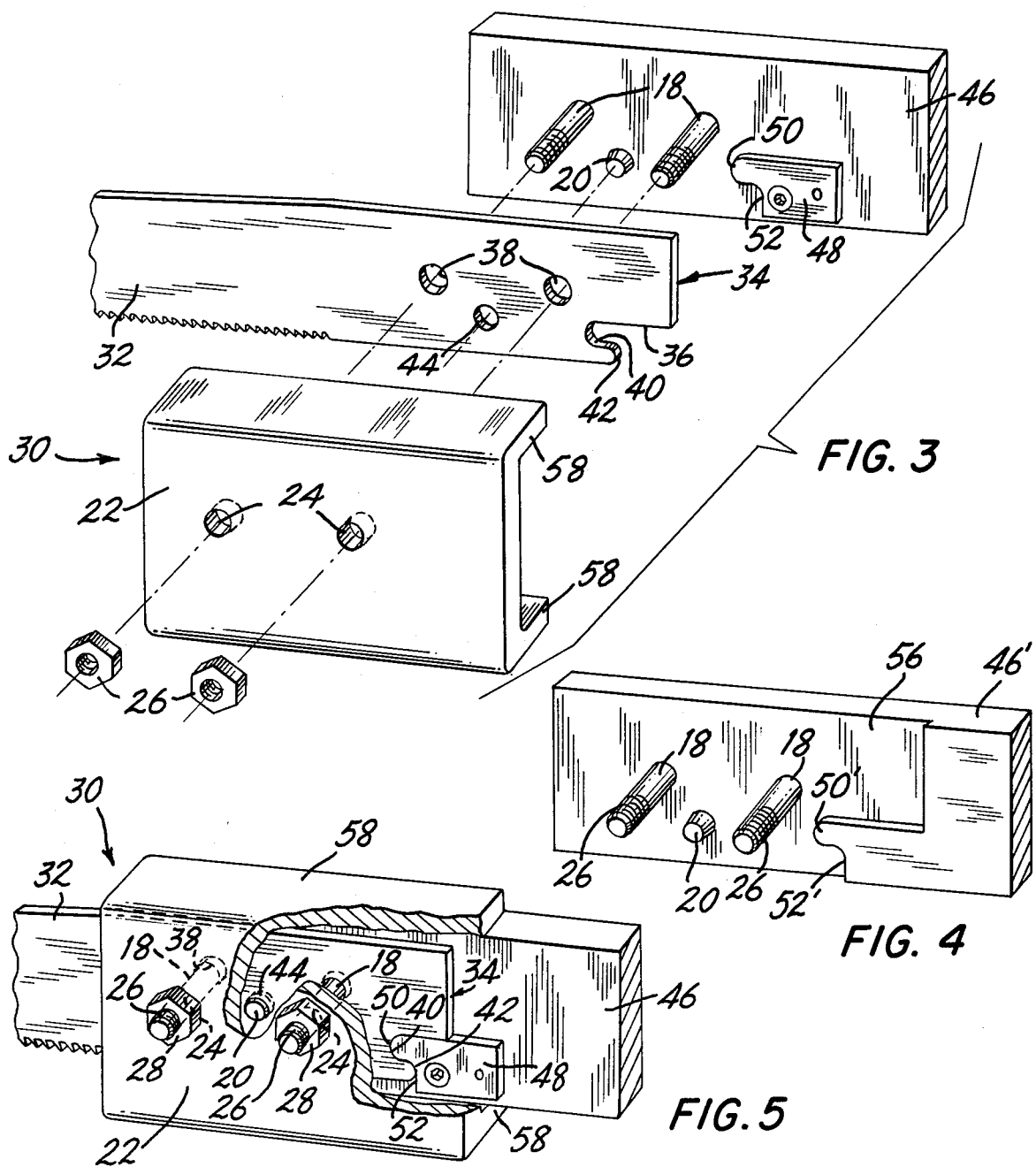

PORTABLE HACKSAW

BACKGROUND OF THE INVENTION

This invention relates to hacksaws and more particularly to portable power hacksaws.

To make a hacksaw blade replaceable, the prior art has generally employed a blade having several holes through which a corresponding number of threaded pins, affixed to a shaft from the motor, pass. A cover and fastening nuts, applied and removed using a wrench, complete the assembly.

Hacksaws in industry are usually mounted in clamps or jigs and used repetitively to saw workpieces one after another. To replace the blade typically means removing the hacksaw from its clamp or jig and then removing a cumbersome holding device; production is decreased. Overtorqued nuts and pin threads strip, requiring nut replacement and in some cases replacement of the hacksaw shaft, further delaying production.

Pin mounted blades tend to contain a fair degree of slop due to the tolerances which are allowed on the sizing of the pins and pin holes in the haft of the blade, thus tending to increase vibration stress in the blade and to increase the tendency of the blade to loosen its nuts or possibly to break.

SUMMARY OF THE INVENTION

In accordance with one aspect of the invention, the rear of the blade haft is undercut along a line generally parallel to the toothed surface of the blade. At its leading end, the shaft mirrors the shape of the haft and provides a surface against which the haft rests. Pins are employed to secure the blade to the shaft. The complementary surfaces on the blade and shaft tend to reduce or prevent rotational movement of the blade about the pins, and also tend to reduce localized stress concentration about the pins.

This invention also includes new and novel apparatus for securing the blade in place against the shaft, yet permits blade removal and replacement without the need to use wrenches or other tools external to the apparatus itself.

In one embodiment, the novel apparatus is mounted to the shaft with sufficient room provided between the shaft and the apparatus to allow a blade to be inserted. The apparatus is further provided with a movable member and a plurality of pins whose purpose is to engage cooperating openings in the blade when the movable member is translated to cause the pins and openings to engage, thus anchoring the blade to the shaft.

In a second embodiment, several relatively short pins are fixed to the shaft and extend therefrom into holes in the haft of the blade. An additional pin, longer than the others, passes through the thickness of the blade and also through the clamping apparatus. The additional pin is long enough to allow the clamping apparatus to translate to and fro thereon. The free end of the pin is captured by a mechanism comprising an eccentric mass operated by a handle which, when rotated about an axis normal to the pin, translates the clamping apparatus to secure the blade against the shaft and when returned to its original position, allows the clamping apparatus to release its pressure on the blade. In a refinement of this embodiment, the entire clamping mechanism can be made removable with a simple twist of the handle by providing screw threads on the additional pin and a cooperating threaded opening on the shaft.

In still a further refinement of the second embodiment, the blade is slit from the rear of the haft a distance along the length of the blade sufficient to allow the blade to be pushed in between the clamping plate and the shaft. The additional pin, secured to the shaft and for best results permanently so, rests within the slit after the blade has been pushed home. Sufficient clearance exists between the ends of the other pins and the clamping plate to accommodate the thickness of the blade as it is pushed home to embrace the additional pin, the clearance reducing essentially to zero as the eccentric mass mechanism is operated to translate the clamping plate against the blade.

Whether the blade is provided with a slotted haft or not, the same eccentric mass mechanism can be employed for quick release of the blade to permit its replacement by another blade without the need to remove the hacksaw from its clamp or jig. It is to be understood that the complementary shapes of haft and saw blade earlier described can be employed to advantage with the prior art and the novel clamping devices described in this application.

DESCRIPTION OF PREFERRED EMBODIMENTS

Turning now to the drawings, in which like numerals denote like parts:

FIG. 1 is a diagrammatic sketch of a power hacksaw;

FIG. 2 is an exploded isometric detail of a prior art blade and shaft assembly;

FIG. 3 is an isometric drawing illustrating a modified form of shaft;

FIG. 4 is an isometric drawing illustrating a modified form of shaft in accordance with the instant invention;

FIG. 5 is an illustration of the assembly of the components shown in FIG. 3;

Figure 8A:
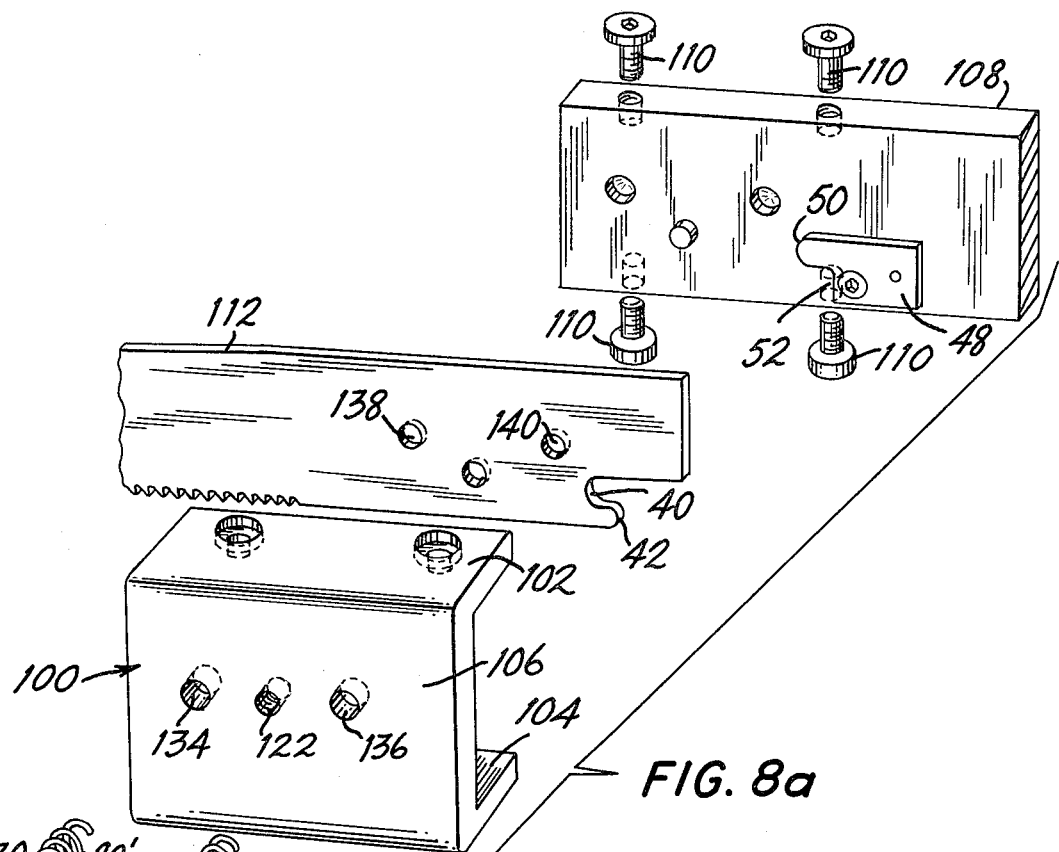
Figure 8B:
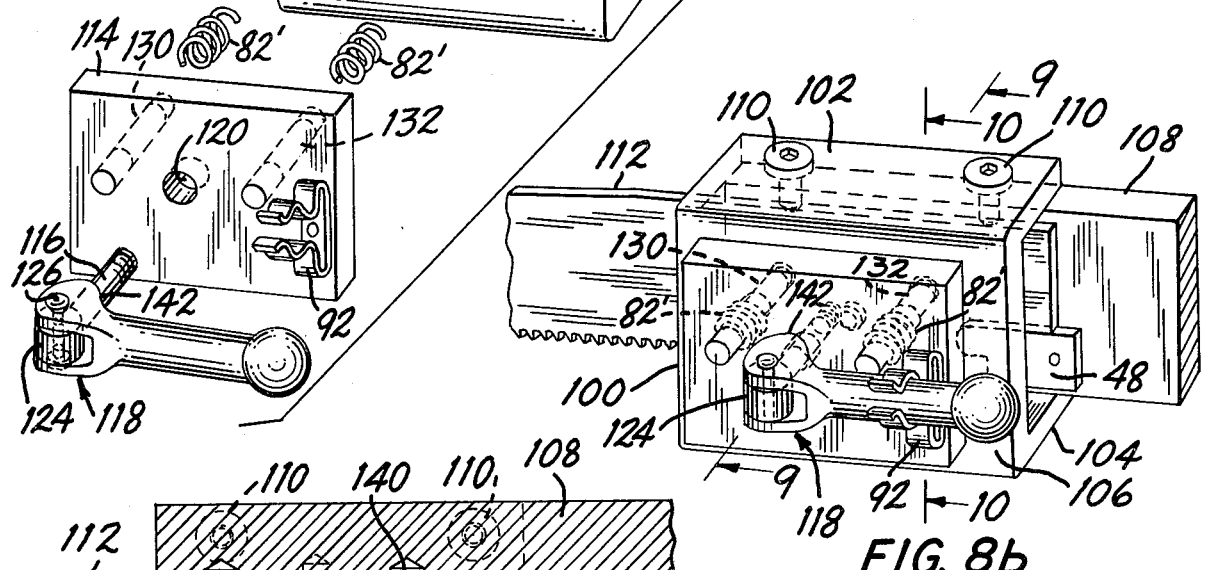
Figure 9:
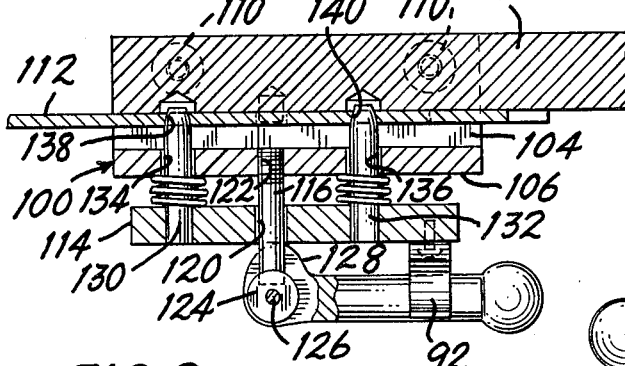
Figure 10:
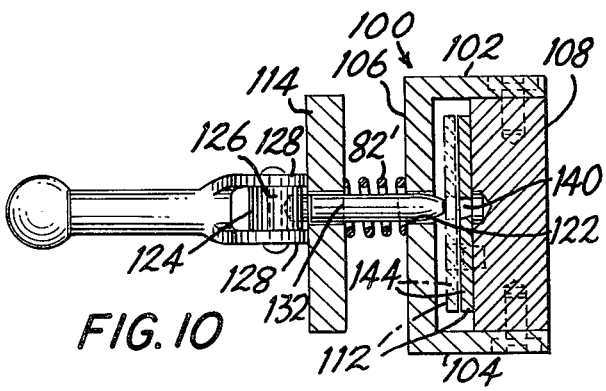

FIGS. 6(a) and 6(b) are isometric illustrations of an assembly employing one embodiment of the novel clamping apparatus;

FIGS. 7(a) and 7(b) are details of the assembly of FIG. 6 taken along line 7—7 in FIG. 6(b);

FIGS. 8(a) and 8(b) are isometric drawings of another embodiment of the novel clamp assembly of the invention;

FIG. 9 is a detail view of the apparatus illustrated in FIG. 8(b) taken along line 9—9 in FIG. 8(b); and FIG. 10 is a detail view of the apparatus illustrated in FIG. 8(b) and taken along line 10—10 and showing the apparatus in position to release the blade.

Numeral 10 denotes a hacksaw body containing standard hacksaw drive components such as an electric or pneumatic motor. Neither one is shown as the internal motion generating components of the hacksaw form no part of the present invention. Numeral 12 refers to a conventional shaft connected to the motor by well known and conventional means, the shaft reciprocating along its axis, thus providing the linear saw blade motion of a typical power hacksaw. In FIG. 2, numeral 14 refers to a conventional hacksaw blade, the haft of the blade containing a pair of holes 16 with a third, smaller hole located off the line connecting the holes 16. The shaft for this blade has two pins 18 and an additional pin 20, all located to align with the holes in the haft of the saw blade. The blade is mounted on the pins on the shaft, and a cover 22 fitted over the haft of the blade with pins 18 passing through openings 24 in the cover.

The threaded ends 26 of pins 18 are captured by nuts 28 which, when tightened using a wrench or other tool, tend to force the blade against the shaft in a relatively tight relationship. Blade replacement requires the reversal of these steps to remove the cover and old blade, and the repetition of this assembly method to install the new blade.

The third pin 20 is shorter than pins 18, needs no thread, and is generally used to provide a third mounting point to better secure the blade against the hacksaw shaft.

FIG. 3 illustrates the old clamp, here denoted by the numeral 30, the new blade, denoted by the numeral 32, and the assembly of clamp and blade to the hacksaw shaft.

As to the blade, the haft or rear portion 34 of the blade is cut to remove material therefrom. As illustrated, the removed portion of the haft extends from its rear face forward to form a female recess 40. The recess 40 terminates in a wall 42 which is located forward of and is generally parallel to the rear face of the haft and continues to the bottom of the haft along the edge containing the teeth of the blade. A third hole 44 in the haft, out of the imaginary line connecting holes 38, completes the description of the new blade.

On the shaft 46, a mountng block or brace 48 is provided and bolted or otherwise conventionally secured to the shaft. The nose or male abutment 50 of the block matches female recess 40 and is captured therein when the blade is assembled to the shaft. Wall 52 is complementary to the wall 42 on the blade and provides an additional supporting surface for the blade after it is assembled on the shaft.

FIG. 4 illustrates a shaft which, instead of block 48, has been shaved to reduce its thickness in the region denoted by the numeral 56. The shaved section is in the shape of the block 48 and is provided with a male abutment 50' and a cooperating wall 52'. The type of hacksaw determines the duty to which it will be subjected and also determines the stresses which the shaft must be designed to carry. These design parameters, which will dictate the thickness of the shaved portion of the shaft, are well known to those skilled in the art and need not be described in this specification.

FIG. 5 illustrates the novel blade employed with the conventional cover of the type illustrated in FIG. 1. The additional anchoring surfaces provided on the block by abutment 50 and wall 52 in cooperation with the recess 40 and wall 42 tend to prevent the rotation of the blade about the pin 18, tend to reduce vibration chatter, and tend to reduce to and fro movement of the blade with respect to the shaft on which it is mounted. By increasing the number of contact surfaces between blade and shaft, stress concentration tends to be reduced and consequently, the danger of catastrophic blade failure is reduced, all resulting in better protection for personnel against physical harm.

One embodiment of the new clamp, illustrated in FIGS. 6(a) and (b) and defined by a pair of spaced, parallel legs 58 connected by body 60, is provided with an opening 62 in which pin 64 is located. One end of pin 64 contains a bore 66 in which a pin 68 is journalled. The other end of pin 64 is preferably permanently affixed to the shaft. A bifurcated lever 70 is mounted on the ends of pin 68 and each arm of the lever is provided with an eccentric mass 72, similar to an egg in shape, but with a flat surface 74 contiguous to the rounded nose 76.

The shaft 12" is provided with a pair of pins 78 shorter in length than pin 64. Absent from pins 78 are screw threads on their free ends, as these are not essential when using the clamp. The pins are made long enough to engage in corresponding openings 80 in the haft of the blade, yet short enough to have sufficient clearance between their ends and the untranslated clamp to remove a used blade and to insert a new one.

A spring 82 is located on said pin and may have one end secured to the body by conventional means. When compressed, a condition which will obtain when the cam is in position to clamp the blade and shaft together, the spring will aid in the return of the body to its original position when the cam is turned to release the assembly.

The absence of screw threads on pins 78 is not essential to proper operation of the clamp. Indeed, the conventional arrangement of pins may be employed with the novel clamp, without the fastening nuts.

For best results in connection with the use of the clamp described in this embodiment, the blade is provided with an elongated slot 90 which extends from the rear surface of the blade to a point under holes 80.

Removal of a worn out blade is achieved by following the assembly steps in reverse.

Referring to FIGS. 8 and 9, which illustrate another embodiment of the novel clamp, 100 denotes the clamp, the numerals 102 and 104 denote the legs, and the numeral 106 denotes the body which bridges and connects the legs 102, 104. The legs are affixed to the shaft 108 by conventional screws 110. The blade is denoted in this embodiment by the numeral 112.

Plate 114 is located above the clamp body 106, its location determined by pin 116 and cam mechanism 118. Pin 116 passes through an opening 120 in the plate and is anchored by screw threads in a cooperating threaded opening 122 in clamp body 106. The other end of pin 116 is provided with a base 124 in which a pin 126 is rotatably placed. To this pin 126 are mounted two eccentric, cam-shaped parts denoted by the numeral 128, thus completing the assembly of the plate 114 to the clamp 100.

Plate 114 is provided with two additional pins 130, 132 which freely pass through cooperating holes 134, 136 in body 106. The ends of these pins are slightly larger than the holes in the haft of the blade, here indicated by the numerals 138, 140, and the pins have the shape of a truncated cone, allowing them to enter the holes 138, 140 until a sufficiently wide part of the cone-shaped pins contacts the edges of the holes.

The eccentric masses 128 have connected thereto a bifurcated lever 142 which, when rotated to the full line position shown in FIG. 8(b), translates plate 114 toward the body 106 and pins 130, 132 into the holes in the haft of the blade. When the bifurcated lever is moved into the position shown in FIG. 10, plate 114 translates away from the body 106, carrying with it pins 130, 132, thus permitting the removal and replacement of the blade without removing the clamp from the shaft and without the need for wrenches or other tools external to the clamping apparatus.

The jig or clamp for the hacksaw has been omitted from the drawings for the sake of clarity and as they are conventional fixtures well known to those skilled in the art.

If desired, a clamp 92 may be pivotally mounted on the cover as shown in FIG. 8, its purpose being to capture the lever and prevent its accidental release during the operation of the hacksaw.

With the novel changes, it is not essential for the movable pins to actually contact the shaft. As the clamp itself is secured to the shaft, the pins may contact only the cooperating holes in the haft of the blade to properly and tightly secure the blade against the shaft.

Many modifications may be made by those of ordinary skill in the art, and it is intended to cover all such modifications which fall within the spirit and scope of the invention as defined in the claims appended hereto.

What I claim is:

1. A toothed hacksaw blade having a haft, said haft having a rear face, a portion of said haft extending from and forward of said rear face being removed from said haft to form a female recess therein, said female recess terminating in a wall located forward of said rear face, said wall being generally parallel to said rear face and continuing to the edge of said haft containing the teeth of said blade.

2. The hacksaw blade according to claim 1 further comprising a slot in said haft extending from said rear face forward a selected distance along said blade.

3. In a hacksaw having a body, a motor and a shaft connected to the motor for reciprocating motion, the combination of a blade connected to the shaft, said blade having a haft with a rear surface, said rear surface being cut away, the cut away portion being defined by a line continuing in the long direction of said blade which line at the terminal end of its travel defines a female recess and a wall generally parallel to and spaced inwardly from the rear surface of said haft, cooperating means on said shaft for abutting said recess and said wall in supporting relationship, and means for securing said blade and shaft together.

4. The hacksaw according to claim 3 wherein said cooperating means comprises a block having a male abutment for engaging in said recess, and a cooperating wall for engaging the wall of said recess, said block being fixedly mounted to said shaft.

5. The hacksaw according to claim 3 wherein said means for securing said blade and shaft together comprises clamping means secured to the shaft, said blade having one or more holes in the haft, one or more pins relatively movable in and out of said holes to secure said blades against the shaft and to permit the removal and replacement of the blade, and operating means for controlling the movement of said pins.

6. The hacksaw according to claim 5 wherein the movable pin or pins are mounted on said clamping means, said clamping means being movable toward and away from said shaft to cause said pins to move in and out of said holes.

7. The hacksaw according to claim 5 wherein the clamping means comprises a clamp secured to said shaft, a plate movably mounted on said clamp, the pin or pins being mounted on said plate for movement into and out of the holes in said blade.

8. The hacksaw according to claim 6 further comprising another pin for mounting said clamp to said shaft, said other pin passing through the haft of said blade.

9. The hacksaw according to claim 8 wherein said other pin is fixedly mounted to said clamping means and to said shaft, said blade having a slot extending from the end of the haft a distance sufficient to embrace said pin to allow insertion and removal of the blade between the clamping means and the shaft.

10. The hacksaw according to claim 9 wherein the number of movable pins equals two and further comprising a small locating pin on said shaft, a corresponding locating hole on the haft of the blade for cooperating with said locating pin to aid in positioning the blade on the shaft.

11. The hacksaw according to claim 8 wherein said operating means comprises an eccentric mass rotatably mounted in the said other pin and means for rotating said eccentric mass to move said clamping means.

12. The hacksaw according to claim 7 wherein said clamp comprises a further pin fixably mounted on said clamp, said further pin passing through said plate, said one or more movable pins mounted on said plate; one or more holes in said clamp for cooperating with said one or more movable pins for permitting the one or more movable pins to be moved into and out of engagement with the holes in said blade, said operating means being mounted on said plate.

13. The hacksaw according to claim 12 wherein the ends of said one or more movable pins are threaded and the one or more cooperating holes in the haft of the blade are smaller than the widest portion of the movable pins.

14. The hacksaw according to claim 12 wherein the operating means comprises an eccentric mass rotatably mounted on said further pin; and means for rotating said eccentric mass to move said plate.

15. The hacksaw according to claim 14 wherein said operating means comprises one or more return springs mounted between said plate and clamp for moving said plate to a position in which the blade is released when the eccentric mass is rotated to remove the pins from the cooperating holes in the haft of the blade.

* * * * *